Dec. 8, 1959     C. B. HEBELER ET AL     2,915,911

MOTION CONVERTER

Filed Dec. 21, 1956     3 Sheets-Sheet 1

INVENTORS
CHARLES B. HEBELER
FRANKLIN W. KERFOOT JR.
BY   CARL H. WEIDENHAMMER

AGENT

Dec. 8, 1959  C. B. HEBELER ET AL  2,915,911
MOTION CONVERTER
Filed Dec. 21, 1956  3 Sheets-Sheet 2
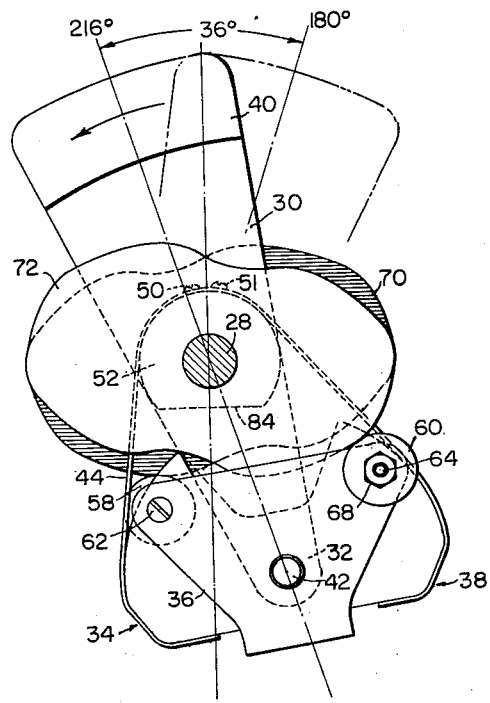
Fig.4
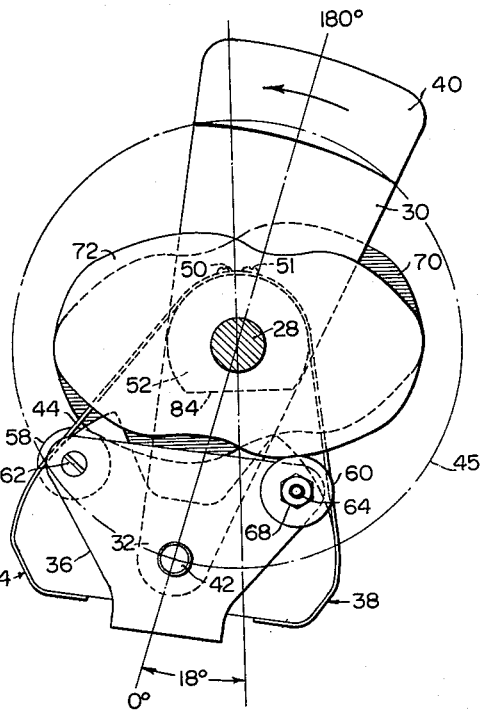
Fig.3
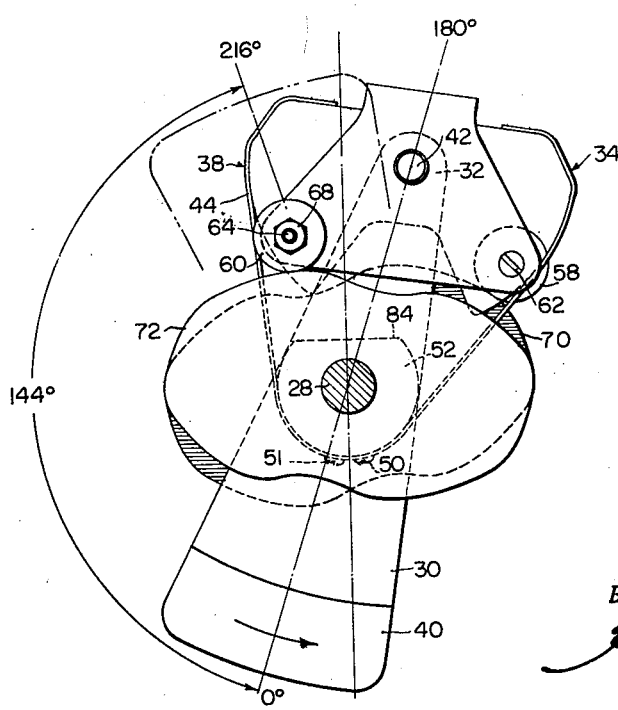
Fig.5
INVENTORS
CHARLES B. HEBELER
FRANKLIN W. KERFOOT JR.
BY CARL H. WEIDENHAMMER
AGENT

United States Patent Office
2,915,911
Patented Dec. 8, 1959

2,915,911

MOTION CONVERTER

Charles B. Hebeler, Yeadon, Franklin W. Kerfoot, Jr., Broomall, and Carl H. Weidenhammer, Conshohocken, Pa., assignors to Burroughs Corporation, Detroit, Mich., a corporation of Michigan Application December 21, 1956, Serial No. 629,840

19 Claims. (Cl. 74—393)

This invention relates to motion transmission apparatus and in particular to mechanisms for converting constant angular motion to varying angular motion.

The invention embodies a novel motion mechanism, distinguished by its improved operation, over other known motion converting devices which, for example, might use gear trains and cam means as part of the transmission mechanism. It is generally known that the use of gears is attended by backlash, inaccuracies due to wear of the gear teeth, and the need for lubrication. In those known mechanisms where plate cams are used, it is common practice to employ spring members for confining the associated cam followers to the contours of the cams, and such arrangements usually complicate problems of design by the introduction of additional forces. It is recognized that the use of springs is not always resorted to, particularly in those mechanisms utilizing grooved face cams, but the use of face cams is generally avoided where practical because of their higher costs as compared to the cost of the plate type cam.

It is an object of the present invention to provide a novel motion converting device of improved design.

It is also an object of the invention to provide such a device wherein the transmitting mechanism is characterized by the absence of gear means.

Another object of the present invention is to provide a motion converting device eliminating the need for springs or other biasing devices.

A specific object of the present invention is to provide such a device wherein the transition is from constant rotative angular motion to intermittent angular motion.

A further object is to provide motion converting apparatus wherein the transition from one mode of angular motion to another is accomplished smoothly and efficiently with a minimum of pulsations and vibrations.

Briefly described and in accordance with the illustrated embodiment more fully described hereinafter, the invention comprises a plurality of novel cam members disposed in co-axial alignment with a constantly rotating input shaft and an intermittently rotatable output shaft. The input shaft carries a pivotally mounted cam follower and drives it in revolving motion about the cams. Undulations on the cam surfaces cause the follower to oscillate on its pivot, and this oscillatory motion is transmitted to the output shaft by means of a flexible tape which connects the output shaft to the follower. In this manner, the oscillating cam follower effects alternate periods of dwell and of rotation of the output shaft.

The invention will be best understood from the following detailed description of a specific embodiment thereof when read in conjunction with the accompanying drawings, in which Fig. 1 is an end view of a specific embodiment of the invention taken on line 1—1 of Fig. 2;

Figs. 3, 4 and 5 are schematic illustrations of portions of the operating mechanism removed from the housing, and illustrate different relative and angular positions of its moving parts when the device is in operation;

Figure 1:
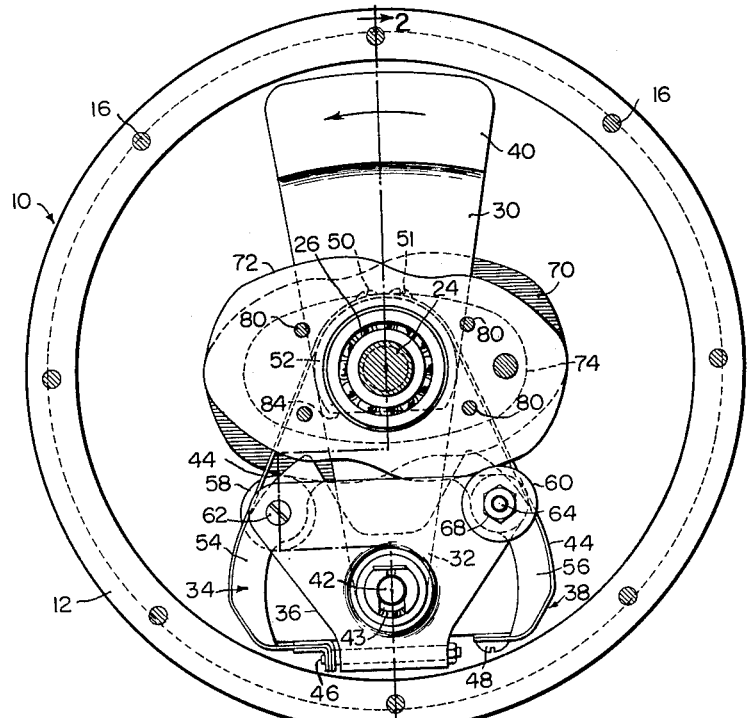
Figure 2:
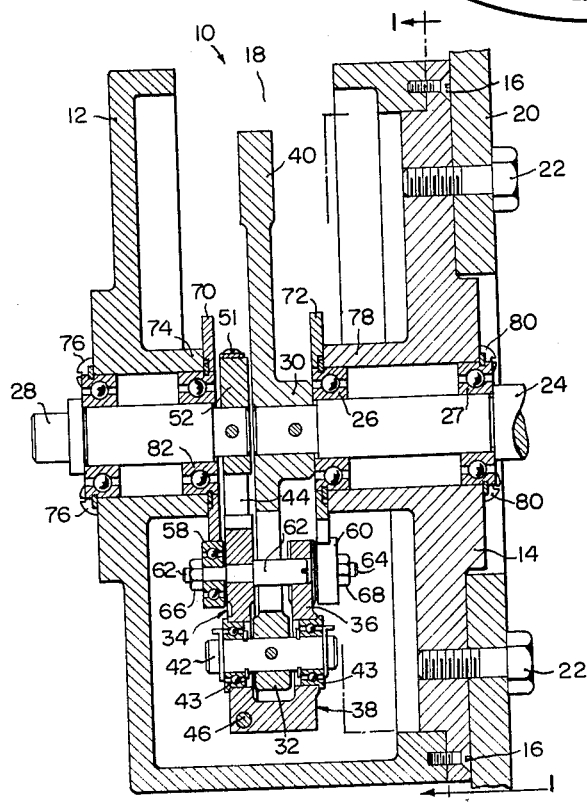
Fig. 2 is a sectional view taken on line 2—2 of Fig. 1.

Referring to the drawings illustrating an exemplary embodiment of the invention, and particularly to Figs. 1 and 2, it is seen that the operating mechanism is supported in a cylindrical housing indicated generally by the numeral 10, which comprises a body 12 and an end cover plate 14 attached thereto by means of flat headed screws 16. The body 12, preferably as shown, is provided with an arcuate aperture 18 on its periphery for inspection purposes, and the aperture may be suitably closed in any convenient manner, as by an arcuate cover plate (not shown), to shield the internal mechanism against the entry of foreign matter. As a component of a major machine assembly in which it is to be used, the converter assembly may be secured to a machine member 20 by bolts 22 engaging the end cover plate 14, or in any other suitable manner.

The power input to the device is an input shaft 24 which is journalled in end cover plate 14, preferably in anti-friction bearings 26 and 27, for rotation by a suitable source of power, such as an electric motor. The driven or output shaft 28 is similarly journalled in body 12 in axial alignment with input shaft 24, for intermittent, angular rotation, as described hereinafter.

Transmission of motion from input shaft 24 is effected through a crank 30 which may be pinned or otherwise secured thereto, as seen in Fig. 2. One end 32 of crank 30 terminates between two parallel arms 34 and 36 of a cam follower 38, and the other end terminates in a counterweighted portion 40 which serves to place the mechanism in dynamic balance.

The cam follower 38 straddles crank end 32 and is rockably mounted on the ends of a shaft 42 which projects through crank end 32 and is pinned or otherwise secured thereto. As illustrated, cam follower 38 is preferably provided with anti-friction bearings 43, for mounting on shaft 42. The motion of the mechanism as described thus far is such that rotation of input shaft 24 will cause cam follower 38 to be driven in a circular orbit as indicated by broken line 45 in Fig. 3.

The motions of cam follower 38, which will be described more fully hereinafter, are transmitted to output shaft 28 by means of a flexible tape or belt 44 which as seen in Fig. 1, has its ends fastened to cam follower 38, as by bolt 46 and screw 48 respectively, and its medial portion fastened, as by screws 50 and 51, to a flatted collar 52 which is secured on the inner end of output shaft 28. The flexible tape 44 passes around arcuate portions 54 and 56 of arm 34, the arcuate portions thereof being concentric with shaft 42. The tape 44 is assembled under tension between arm 34 and collar 52, and provides a positive drive between cam follower 38 and output shaft 28, thereby providing smooth and instantaneous responses of the output shaft to the oscillations of the cam follower on shaft 42 without the presence of backlash, a fault generally found in gear train transmission systems.

At one end of arm 34 there is provided a roller 58 and at an oppositely disposed end of arm 36 there is provided a roller 60, both rollers being preferably of the anti-friction type and mounted for rotation on stud shafts 62 and 64 respectively. The stud shafts are supported in transverse holes passing through arms 34 and 36, stud shaft 62 being shouldered against the inner face of arm 34 as seen in Fig. 2, and, while not shown, stud shaft 64 is similarly shouldered against the inner face of arm 36. Nuts 66 and 68 which secure rollers 58 and 60 on the outer ends of the respective stud shafts also hold the shafts against rotation by being drawn tightly against the inner races of rollers 58 and 60.

In order to provide oscillatory motion to cam follower 38, rollers 58 and 60 are engaged respectively with two fixed cams 70 and 72, cam 70 being fixedly attached to an inner boss or pad 74 of body 12, as by four screws 76 passing through holes in body 12 and threadedly engaging tapped holes in the cam. Cam 72 is similarly attached to an inner boss or pad 78 of end cover plate 14 by means of screws 80 passing through holes in the cover plate and threadedly engaging tapped holes in the cam. The arrangement of the cams is such that their respective axes are coincident with the axes of input and output shafts 24 and 28. As illustrated in Fig. 2, one method of aligning the cams with the input and output shafts is by fitting them on peripheral portions of bearings 26 and 82 projecting beyond inner pads 78 and 74 respectively, each being provided with an axial bore for this purpose.

The operation of the device is such that as input shaft 24 rotates, cam follower 38 and its associated rollers 58 and 60 are revolvingly driven about the fixed cams by crank 30. The reaction of the rollers to the undulations of the fixed cams causes the cam follower to oscillate on shaft 42 relative to input shaft 24, and by means of flexible tape 44 the oscillatory motion of cam follower 38 is transferred to output shaft 28. The oscillatory motion of the cam follower causes the output shaft to dwell and to rotate alternately as will be described more fully hereinafter.

The cams are complementally arranged so that together they cooperate to cause the aforesaid oscillation of cam follower 38, a motion which neither could accomplish separately in this particular arrangement. The cams are so formed that as one rises the other falls to the same extent, so that each cam confines the follower roller associated with the other cam to the contour of that cam, thereby eliminating the need for spring members or other biasing devices.

In the illustrated embodiment, output shaft 28 is adapted to be intermittently rotated through an angular motion comprising dwell-rotate-dwell periods, the cams being formed to impart to the output shaft two periods of dwell and two angular rotative movements of 180° each during one revolution of input shaft 24, one period of dwell alternating with one period of rotation.

The motions of output shaft 28 relative to input shaft 24 and crank 30 may be illustrated by reference to Figs. 3, 4, and 5. In these figures the input shaft is not shown but it will be recalled that crank 30 is secured to the input shaft and rotates with it.

It will be seen that in order to rotate output shaft 28 relative to crank 30 there must be oscillation of cam follower 38 on shaft 42. If the arrangement were such, for example, that the cam follower would not oscillate, it is obvious that the entire mechanism would revolve as a single unit and that crank 30 and output shaft 28 would revolve at the same constant rate of speed. Such would be the case, for example, if the cams were cricular discs concentric with the axes of the input and output shafts. Consequently, the cams are formed to impart the necessary oscillatory motions to the cam follower to effect the dwells and rotative motions of the output shaft as will presently be described.

In Fig. 3 the mechanism is shown at the beginning of a dwell period at which time the centerline of crank 30 is at an angular position of 18° from the vertical. To illustrate the generation of a dwell, assume that crank 30 has rotated in a counter-clockwise direction through an angular distance of 36° to the position shown in Fig. 4, which in this particular embodiment represents a dwell period of output shaft 28. In order to accomplish this dwell period of the output shaft during this 36° rotation of crank 30, cam follower 38 is forced to rotate clockwise on shaft 42, its action being governed by cams 70 and 72. The motion of cam follower 38 is such that it will allow a certain amount of tape 44 to be unwrapped from that portion of collar 52 to the right of screws 50 and 51 while increasing the wrap on that portion of collar 52 to the left of the screws an equivalent amount, the net effect of this action causing collar 52 to remain stationary. As was mentioned earlier, collar 52 is secured to output shaft 28. The dwell of output shaft 28 may also be seen by noting the unchanged position of flat 84 on collar 52 in Figs. 3 and 4.

The output shaft 28 rotates 180° during 144° of rotation of crank 30 in the specific application of the invention here shown. Stated in another way, a dwell period and a 180° rotative movement of output shaft 28 occur during each 180° of rotation of constantly rotating crank 30. The rotative movement of output shaft 28 may be understood by comparing the illustrations in Figs. 4 and 5. When crank 30 has moved from its 216° position in Fig. 4 to 0° position in Fig. 5 through an angle of 144°, output shaft 28 will have been rotated in the same direction as the crank, that is, counter-clockwise, and through an angle of 180° as will be further seen by noting the changed position of flat 84 on collar 52, in Figs. 4 and 5.

Figure 6:
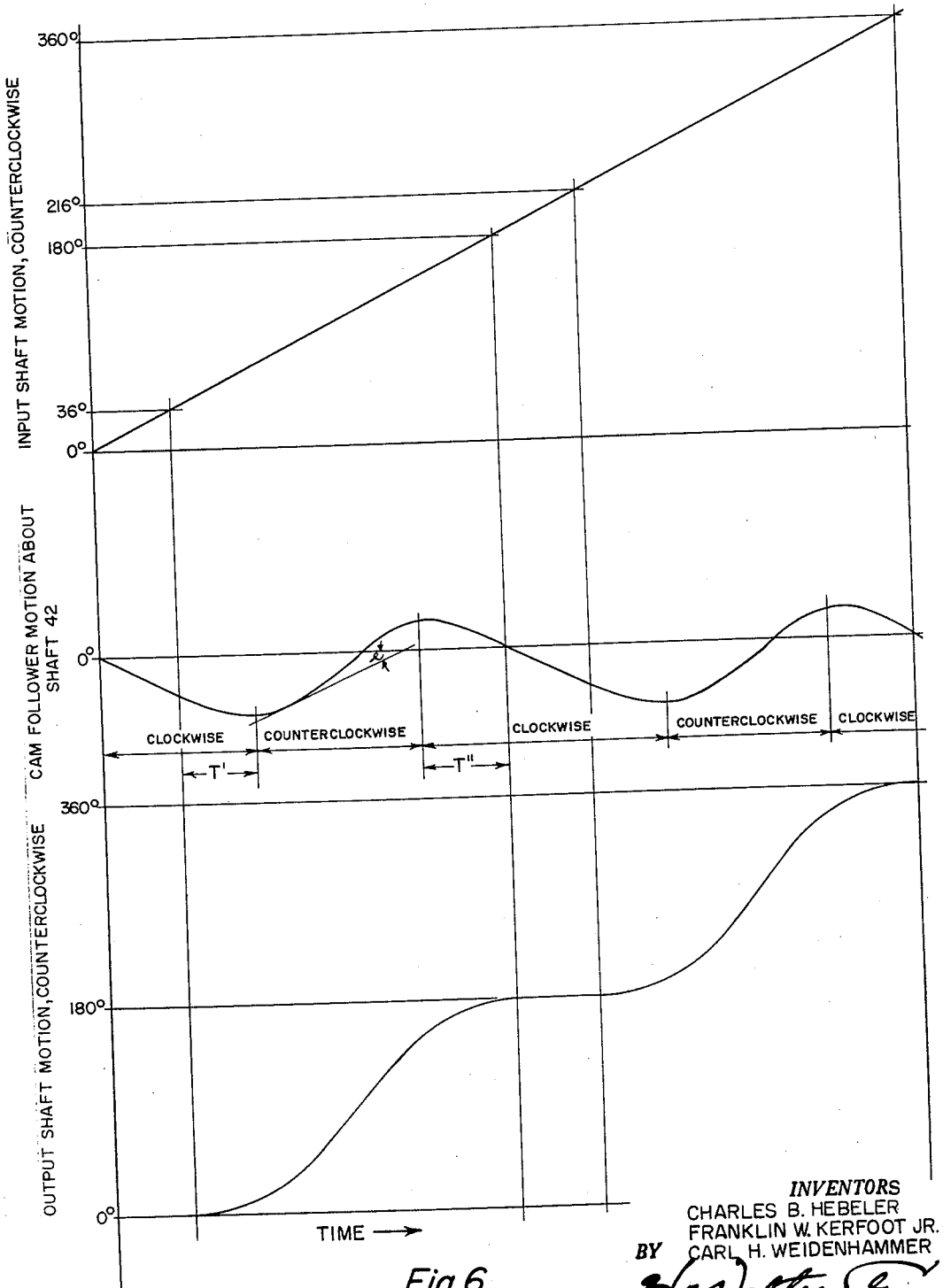
Fig. 6 is a motion curve diagram illustrating the relative motions of certain parts of the mechanism.

It will be apparent therefore that, during its rotative movements, the output shaft must be rotated at a higher average angular velocity than the input shaft. This is accomplished by having the cams impart to the cam follower a movement, substantially counter-clockwise, at such velocities as will be necessary to rotate the output shaft at a higher average velocity than the input shaft and in the same direction. The instantaneous angular velocity to be imparted to the cam follower, as indicated by angle $e$ (the instantaneous slope of the motion curve) in Fig. 6, is a function of the ratio of the diameter of collar 52 to the diameter of a circle coincident with arcuate portions 54 and 56 of arm 34 having its center at the center of shaft 42. In the illustrated device shown in the drawings, this ratio has been chosen to be somewhat less than 1:2.

The motion of the cam follower has been described in the preceding paragraph as substantially counterclockwise. This is so because shortly after the beginning of a rotative movement of the output shaft the cam follower begins to merge from a clockwise motion into a counterclockwise motion so that there is a time interval $T'$, Fig. 6, during which the cam follower is rocking clockwise although the output shaft is rotating counterclockwise. This is explained by the fact that the clockwise motion of the cam follower as just described is at a lower angular velocity than the input shaft. Similarly, near the end of a rotative movement of the output shaft the cam follower begins to merge from a counter-clockwise motion to a clockwise motion so that there is also here a time interval $T''$ during which the cam follower is rocking clockwise while the output shaft is rotating counter-clockwise. The relative motions of the various components described above are illustrated further in the motion curve diagram in Fig. 6.

The dwell and rotative motion of the output shaft have been described for one half revolution of the crank and the input shaft, and since the same dwell and rotative motion are repeated during the other half revolution of the crank and input shaft, it is obvious that the cams are formed to provide two dwells and two rotative motions of the output shaft during each revolution of the crank and input shaft.

From the foregoing description of a specific embodiment of the invention, it will be apparent to those skilled in the art that the invention may be embodied with equal facility in various other forms. Such forms, for example, may include intermittent motion converting devices having a larger number of dwells and angular rotative motions of the output shaft per revolution of the input shaft than the illustrated device shown and described herein. It is recognized that by merely changing the cam contours such devices may also be used to cause reverse increments of rotation of the output shaft relative to the input shaft, and still further to cause relative periods of rotations of the output shaft in the same direction. Accordingly, it is to be understood that the invention as herein shown and described, is to be taken as a preferred embodiment of the same and that various changes in size, shape, and arrangement of parts may be resorted to without departing from the spirit of the invention, or the scope of the subjoined claims.

What is claimed is:

1. A motion converting device comprising support means, power input drive means rotatably mounted in said support means, a rockable element mounted on said drive means, means to rock said element during rotation of said drive means, an output shaft, and flexible band means operably connecting said output shaft to said element whereby rocking motion of the latter effects a varying angular velocity of said output shaft, said band means wrapping and unwrapping about said output shaft in response to said rocking motion.

2. A motion converting device comprising support means, a power input drive shaft rotatably mounted in said support means, crank means on said drive shaft and rotatable therewith, an element rockably mounted on said crank means, means to rock said element during rotation of said crank means, an output shaft, and flexible band means operably connecting said output shaft to said element whereby rocking motion of the latter effects a varying angular velocity of said output shaft, said band means wrapping and unwrapping about said output shaft in response to said rocking motion.

3. A motion converting device comprising support means, a power input drive shaft rotatably mounted in said support means, crank means on said drive shaft and rotatable therewith, an element rockably mounted on said crank means, means to oscillate said element during rotation of said crank means, an output shaft rotatably mounted in said support means, and flexible band means operably connecting said output shaft to said element whereby oscillation of the latter effects a varying angular velocity of said output shaft, said band means wrapping and unwrapping about said output shaft in response to said oscillation.

4. A motion transmitting device comprising support means, a power input drive shaft rotatably mounted in said support means, crank means on said drive shaft and rotatable therewith, an element rockably mounted on said crank means, means mounted on said support means to oscillate said element during rotation of said crank means, an output shaft rotatably mounted in said support means, and flexible band means operably connecting said output shaft to said element whereby oscillation of the latter effects a varying angular velocity of said output shaft, said band means wrapping and unwrapping about said output shaft in response to said oscillation.

5. A motion transmitting device comprising support means, cam means attached thereto, cam follower means operably engaging said cam means, rotatable drive means for revolving said cam follower means about said cam means when said drive means is rotating, said cam means causing oscillation of said cam follower means during movement of the latter about said cam means, a driven shaft, and flexible band means operably connecting said driven shaft to said cam follower means whereby oscillation of the latter effects a varying angular velocity of said driven shaft, said band means wrapping and unwrapping about said driven shaft in response to said oscillation.

6. A motion transmitting apparatus comprising support means, cam means attached thereto, cam follower means operably engaging said cam means, rotatable drive means for revolving said cam follower means about said cam means when said drive means is rotating, said cam means being contoured to cause said cam follower means to oscillate and to maintain engagement therewith throughout its movement about said cam means, a driven shaft rotatably mounted in said support means, and flexible band means operably connecting said driven shaft to said cam follower means whereby oscillation of the latter effects a varying angular velocity of said driven shaft, said band means wrapping and unwrapping about said driven shaft in response to said oscillation.

7. A motion converting apparatus comprising support means, cam means attached thereto, cam follower means operably engaging said cam means, rotatable drive means mounted in said support means for revolving said cam follower means about said cam means when said drive means is rotating, said cam means being contoured to cause said cam follower means to oscillate and to maintain engagement therewith during its movement about said cam means, a driven shaft rotatably mounted in said support means, and flexible band means operably connecting said driven shaft to said cam follower means whereby oscillation of the latter effects a varying angular velocity of said driven shaft, said band means wrapping and unwrapping about said driven shaft in response to said oscillation.

8. A motion converting apparatus comprising support means, a plurality of cams attached thereto, a cam follower having elements operably engaging said cams, rotatable drive means mounted in said support means for revolving said cam follower about said cams when said drive means is rotating, said cams being contoured to cause said cam follower to oscillate and to maintain engagement therewith during its movement about said cams, a driven shaft shaft rotatably mounted in said support means, and flexible means operably connecting said driven shaft to said cam follower whereby oscillation of the latter effects a varying angular velocity of said driven shaft.

9. A motion converting device comprising support means, a plurality of cams attached thereto, a cam follower having elements operably engaging said cams, rotatable drive means mounted in said support means for revolving said cam follower about said cams when said drive means is rotating, said drive means including a radially displaced pivotal mounting for said cam follower, said cams being contoured to cause said cam follower to oscillate and to maintain engagement therewith during its movement about said cams, a driven shaft rotatably mounted in said support means, and flexible means operably connecting said driven shaft to said cam follower whereby oscillation of the latter effects a varying angular velocity of said driven shaft.

10. A motion converting device comprising support means, a pair of cams attached thereto, a cam follower having elements operably engaging said cams, a shaft for rockably supporting said cam follower, rotatable drive means mounted in said support means for revolving said shaft and cam follower about said cams when said drive means is rotating, said cams being contoured to cause said cam follower to oscillate on said shaft and to maintain engagement with said cams during its movement thereabout, a driven shaft rotatably mounted in said support means, and flexible means operably connecting said driven shaft to said cam follower whereby oscillation of the latter effects a varying angular velocity of said driven shaft.

11. A motion converting device comprising support means, a pair of cams attached thereto, a cam follower having elements operably engaging said cams, a shaft for rockably supporting said cam follower, rotatable drive means mounted in said support means and including a crank for revolving said shaft and cam follower about said cams when said drive means is rotating, said cams being contoured to cause said cam follower to oscillate on said shaft and to maintain engagement with said cams during its movment thereabout, a driven shaft rotatably mounted in said support means, and flexible means under tension between, and operably connecting said driven shaft and said cam follower whereby oscillation of the latter effects a varying angular velocity of said driven shaft.

12. A motion converting device according to claim 11 wherein said crank is counterweighted to effect dynamic balance in said device.

13. A motion converting device according to claim 11 wherein said flexible means is a flexible tape.

14. An intermittent motion converting device for converting constant angular motion to intermittent angular motion comprising a housing, a pair of co-axial cams attached thereto, a cam follower having elements operably engaging said cams, a shaft for rockably supporting said cam follower, drive means including a crank for revolving said shaft and cam follower about said cams when said drive means is rotating, a driven shaft, and flexible means connecting said driven shaft to said cam follower, said cams being complementally formed at points of engagement with said elements such that as one cam rises the other cam falls to the same extent thereby to maintain said cam follower in engaged position with said cams throughout its movement thereabout, some portions of said cams being contoured to cooperate with said drive means for rocking said cam follower on said shaft in a direction opposite to the direction of rotation of said drive means to an extent effective to cause said driven shaft to dwell relative to said housing, and other portions of said cams being contoured to cooperate with said drive means for rocking said cam follower on said shaft in substantially the same direction as said drive means to an extent effective to cause said driven shaft to make a rotative movement in the same direction as and at an average angular velocity higher than said drive means, thereby effecting a rotative movement of said driven shaft relative to said housing.

15. A motion converting device for converting constant angular motion to intermittent angular motion comprising a housing, a pair of co-axial cams attached thereto in spaced relation to each other, a cam follower, elements on said cam follower operably engaging said cams, a shaft for rockably supporting said cam follower, drive means including a crank for revolving said shaft and cam follower about said cams when said drive means is rotating, a driven shaft, and a flexible tape tensionally connecting said driven shaft to said cam follower, said cams being complementally formed at points of engagement with said elements such that as one cam rises the other cam falls to the same extent thereby to maintain said cam follower in engaged position with said cams during its movement thereabout, some portions of said cams being contoured to cooperate with said drive means for rocking said cam follower on said shaft in a direction opposite to the direction of rotation of said drive means to an extent effective to cause said driven shaft to dwell relative to said housing, and other portions of said cams being contoured to cooperate with said drive means for rocking said cam follower on said shaft in substantially the same direction as said drive means to an extent effective to cause said driven shaft to make a rotative movement in the same direction as and at an average angular velocity higher than said drive means, thereby effecting a rotative movement of said driven shaft relative to said housing.

16. An intermittent motion converting device comprising support means, a pair of co-axial cams attached thereto in spaced parallel relation, a cam follower, elements on said cam follower operably engaging said cams, a shaft for rockably supporting said cam follower, drive means including a crank disposed between said cams for revolving said shaft and cam follower about said cams when said drive means is rotating, a driven shaft rotatably mounted in said support means, and a flexible tape tensionally connecting said driven shaft to said cam follower, said cams being complementally formed at points of engagement with said elements such that as one cam rises the other cam falls to the same extent thereby to maintain said cam follower in engaged position with said cams during its movement thereabout, some portions of said cams being contoured to cooperate with said drive means for rocking said cam follower on said shaft in a direction opposite to the direction of rotation of said drive means to an extent effective to cause said driven shaft to dwell relative to said support means, and other portions of said cams being contoured to cooperate with said drive means for rocking said cam follower on said shaft in substantially the same direction as the drive means to an extent effective to cause said driven shaft to make a rotative movement in the same direction as and at an average angular velocity higher than said drive means, thereby effecting a rotative movement of said driven shaft relative to said support means.

17. An intermittent motion converting device comprising support means, a pair of co-axial cams attached thereto in spaced parallel relation, a cam follower having elements operably engaging said cams, a shaft for rockably supporting said cam follower, a crank disposed between said cams for revolving said shaft and cam follower about said cams when said crank is rotating, a drive shaft extending through one of said cams for rotating said crank, a driven shaft rotatably mounted in said support means and extending through the other of said cams, and a flexible tape tensionally connecting said driven shaft to said cam follower, said cams being complementally formed at points of engagement with said elements such that as one cam rises the other cam falls to the same extent thereby to maintain said cam follower in engaged position with said cams during its movement thereabout, some portions of said cams being contoured to cooperate with said crank for rocking said cam follower on said shaft in a direction opposite to the direction of rotation of said crank to an extent effective to cause said driven shaft to dwell relative to said support means, and other portions of said cams being contoured to cooperate with said crank for rocking said cam followed on said shaft in substantially the same direction as said crank to an extent effective to cause said driven shaft to make a rotative movement in the same direction as and at an average angular velocity higher than said crank thereby effecting a rotative movement of said driven shaft relative to said support means.

18. An intermittent motion converting device comprising a housing, a pair of co-axial cams mounted to and within said housing in spaced parallel relation, a cam follower, elements on said follower operably engaging said cams, a shaft for rockably supporting said cam follower, a counterweighted crank disposed between said cams for revolving said shaft and cam follower about said cams when said crank is rotating, a drive shaft extending through one of said cams for rotating said crank, a driven shaft rotatably mounted in said housing in co-axial relation with said drive shaft and extending through the other of said cams, and a flexible belt tensionally connecting said driven shaft to said cam follower, said cams being complementally formed at points of engagement with said elements such that as one cam rises the other cam falls to the same extent thereby to maintain said cam follower in engaged position with said cams, some portions of said cams being contoured to cooperate with said crank for rocking said cam follower on said shaft in a direction opposite to the direction of rotation of said crank to an extent effective to cause said driven shaft to dwell relative to said housing, and other portions of said cams being contoured to cooperate with said crank for rocking said cam follower on said shaft in substantially the same direction as said crank to an extent effective to cause said driven shaft to make a rotative movement in the same direction as and at an average angular velocity higher than said crank thereby effecting a rotative movement of said driven shaft relative to said housing.

19. An intermittent motion converting device according to claim 18 wherein said drive shaft and driven shaft are in co-axial relation with said cams.

References Cited in the file of this patent

UNITED STATES PATENTS

| | | |
|---|---|---|
| 1,284,733 | Maier | Nov. 12, 1918 |
| 1,330,629 | Gooding | Feb. 10, 1920 |
| 2,589,852 | Overacker | Mar. 18, 1952 |
| 2,758,481 | Mouravieff | Aug. 14, 1956 |